United States Patent [19]

Tsuchiya et al.

[11] Patent Number: 4,970,529

[45] Date of Patent: Nov. 13, 1990

[54] THERMAL PRINTER HAVING CONTROL ARRANGEMENT FOR PROTECTING PRINT HEAD FROM STICKING TO MEDIUM

[75] Inventors: Michio Tsuchiya, Nagoya; Masaaki Terazawa, Ichinomiya; Koji Takeyama, Nagoya; Yutaka Nonomura, Iwakura; Kazuhiro Kuwabara, Tokoname; Shuji Otsuka, Nagoya; Kouichi Mino, Kodaira; Koji Matsumura, Kashiwa, all of Japan

[73] Assignee: Brother Kogyo Kabushiki Kaisha, Tokyo, Japan

[21] Appl. No.: 326,680

[22] Filed: Mar. 21, 1989

[30] Foreign Application Priority Data

| | | | |
|---|---|---|---|
| Mar. 31, 1988 | [JP] | Japan | 63-43534[U] |
| Apr. 1, 1988 | [JP] | Japan | 63-45141[U] |
| Apr. 1, 1988 | [JP] | Japan | 63-81691 |

[51] Int. Cl.[5] .......................... G01D 15/10; B41J 2/00

[52] U.S. Cl. ................................ 346/76 PH; 400/120

[58] Field of Search .................... 346/76 PH; 400/120

[56] References Cited

U.S. PATENT DOCUMENTS 4,300,142 11/1981 Kos ............................... 346/76 PH

*Primary Examiner*—Bruce A. Reynolds
*Assistant Examiner*—Gerald E. Preston
*Attorney, Agent, or Firm*—Oliff & Berridge

[57] ABSTRACT

A thermal printer for printing on a planar recording medium, by heating and thereby coloring a thermally fusible material on the medium. The printer has a thermal print head having heat-generating elements each of which produces heat in contact with the surface of the recording medium, a feeding device for feeding the print head and the recording medium relative to each other, and an anti-sticking device for moving the print head and the recording medium relative to each other, to thereby prevent the print head and the surface of the recording medium from sticking to each other, when the heated thermally fusible material is solidified.

10 Claims, 9 Drawing Sheets

FIG. 7
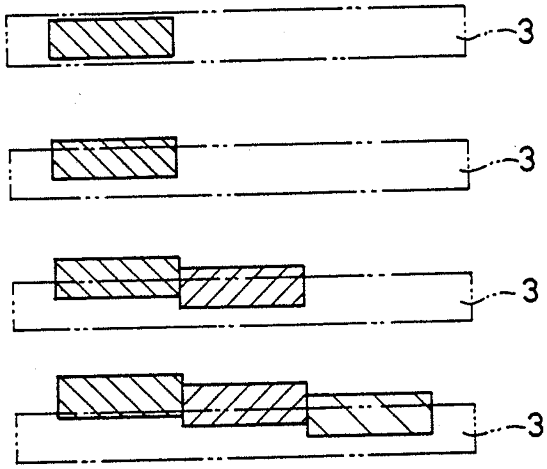
FIG. 8(a)
FIG. 8(b)
FIG. 8(c)
FIG. 8(d)

FIG. 10
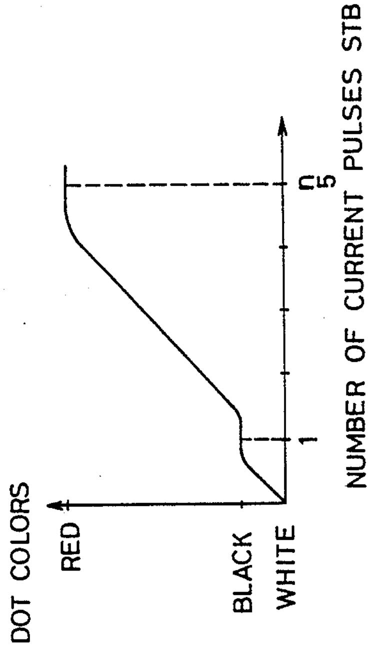
FIG. 11(a)
FIG. 11(b)
FIG. 11(c)
FIG. 11(d)
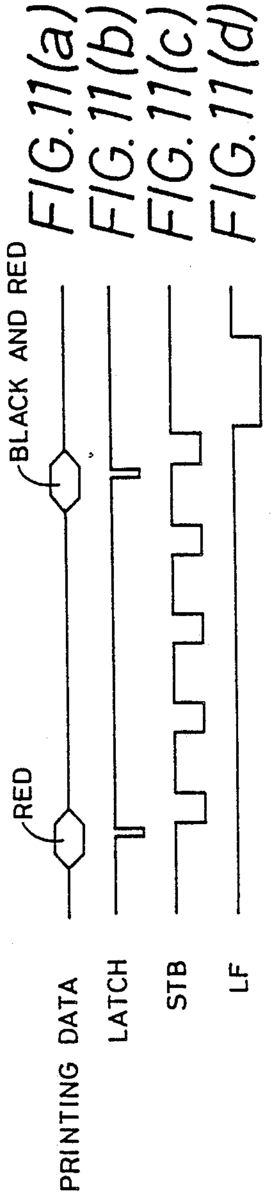

THERMAL PRINTER HAVING CONTROL ARRANGEMENT FOR PROTECTING PRINT HEAD FROM STICKING TO MEDIUM

BACKGROUND OF THE INVENTION

1. Field of the Invention

The present invention relates to a thermal printing apparatus wherein printing is effected on a planar heat-sensitive recording medium, by heating and thereby coloring a thermally fusible heat-sensitive material on the medium, and more particularly to a control arrangement for protecting a print head having heat-generating elements from sticking to the recording medium.

2. Discussion of the Prior Art

For printing desired images on a heat-sensitive recording medium, there is known a thermal line printer with a print head having an array of heat-generating elements arranged along a line of printing. In this thermal line printer, printing takes place with the heat-generating elements energized while the elements are held in contact with a surface of the recording medium, and while the recording medium is incrementally fed in a direction perpendicular to the line of printing, by a suitable drive source. Where an open-loop controlled stepping motor is used as the feed drive source, the feeding rate of the heat-sensitive recording medium may be easily controlled over a relatively wide range, without a speed reduction gear arrangement.

The heat-sensitive recording medium uses a thermally fusible heat-sensitive material which produces a color or colors when the material is heated and melted or fused by the heat-generating elements of the print head. When the heated heat-sensitive material is cooled and solidified, the heat-generating elements tend to stick to the material. When the feeding rate of the medium is relatively high, the medium may be smoothly fed without sticking of the print head to the medium surface, since the print head is in contact with the heated heat-sensitive material while the material is still in a sufficiently molten or less tacky state. When the medium feeding rate is relatively low, however, the print head is likely to stick to the heated heat-sensitive material, since the material has been considerably cooled and solidified before a relative feeding movement between the print head and the medium is initiated. Namely, the feeding increment with respect to the size of the heat-generating elements in the feeding direction is extremely small when the line feeding is effected at a low rate. Further, there exists a non-feeding time during which the heat-generating elements are kept in contact with the same local portions of the recording medium. Accordingly, the once heated heat-sensitive material is considerably solidified in contact with the heat-generating elements, before the medium is incrementally fed.

The sticking tendency of the print head indicated above causes an irregular feeding of the medium, wherein a certain number of first stepping pulses applied to the stepping motor do not cause a feeding movement of the medium, due to the sticking of the print head to the medium surface. That is, such stepping pulses are absorbed or accommodated by a power transmission system which includes a belt, for example. The feeding of the medium is initiated suddenly after the drive force exerted from the power transmission system overcomes the adhesive force between the print head and the medium surface. Thus, the known thermal line printer suffers from an irregular feeding involving unfavorable noises due to the sticking of the print head to the heat-sensitive medium.

A sticking tendency of the print head is also encountered in a thermal line printer of a type wherein the heat-generating elements of the print head are divided into a plurality of groups, so that the individual groups are sequentially operated to sequentially print corresponding divisions of a print line. This arrangement reduces a required capacity of a power source for the print head.

In the above type of thermal line printer, the heat-sensitive medium is fed with the print head held in contact with the medium surface, after the energization of the last group of heat-generating elements.

Since a considerable time is required for the sequential energization of all the groups of heat-generating element, the local portions of the heat-sensitive medium heated by the first and second groups, for example, have been solidified and kept in contact with the corresponding heat-generating elements. As a result, the initially heated portions of the medium tend to stick to the print head.

Thus, the sticking problem is also experienced in the above type of thermal line printer.

A sticking problem of the print head occurs for another reason. Namely, the print head tends to stick to a heat-sensitive recording medium, when printing is effected in two or more colors. Where printing is effected in black and red colors on a white background surface of the heat-sensitive medium, for example, the medium has a substrate on which are formed, a red-coloring heat-sensitive layer for producing red color when heated, an erasing heat-sensitive layer for erasing black color when heated, and a black-coloring heat-sensitive layer for producing black color when heated. These layers are superposed on each other on the substrate, in the order of description.

When a given amount of thermal energy is applied to the above multi-color heat-sensitive medium, only the black-coloring layer becomes active to produce black dots in the heated local portions of the medium. By increasing the thermal energy to a certain level, the erasing layer reacts with the blackened black-coloring layer, so as to erase the produced black dots. With the thermal energy further increased, the red-coloring layer becomes active to produce red dots in the heated portions of the medium.

Thus, the desired images may be printed in the black and red colors, by suitably controlling the amount of heat applied to the appropriate local portions of the medium, or by controlling the amount of an electric current applied to the corresponding heat-generating elements of the print head.

Since the formation of the red dots by heating the red-coloring layer requires a thermal energy which is several times as large as that required for producing the black dots. Therefore, the heat-generating elements should be continuously energized for a considerably long time to produce the red dots. This continuous energization may lead to shortening the life expectancy of the heat-generating elements.

In view of the above drawback, the red-coloring layer is heated intermittently, with the heat-generating elements intermittently energized several times, at a given time interval. In this case, each energization of the heat-generating elements to produce the red dots continues for a relatively short period, but the thermal energy is accumulated and increases to a level sufficient to produce the red dots, without deteriorating the heat-generating elements.

In the above case, the black dots of the relevant print line are first produced, and then the red dots of the line are produced. Alternatively, the energizations of the heat-generating elements corresponding to the black and red dots are initiated at the same time, and the heat-generating elements corresponding to the black dots are deenergized, before the elements corresponding to the red dots are deenergized, that is, before the printing operation of the relevant print line is completed. In the latter arrangement, the printing efficiency is improved, since the heat-generating elements corresponding to both of the black and red dots are simultaneously energized for a certain portion of the entire printing time.

In either of the above two arrangements for energizing the heat-generating elements to produce the black and red dots, however, the local portions of the medium to be colored black or heated by the heat-generating elements corresponding to the black dots have been considerably solidified before the red dots are eventually produced In other words, the heat-generating elements corresponding to the black dots tend to stick to the heated portions of the heat-sensitive medium, while being kept in contact with the medium surface for a relatively long time. Thus, the sticking problem also occurs when a multi-color printing operation is effected, irrespective of whether the heat-generating elements of the print head are divided into a plurality of sequentially energized groups, or not.

SUMMARY OF THE INVENTION

It is therefore an object of the present invention to provide a thermal printer which is substantially free from the conventionally experienced sticking of the print head to the heat-sensitive recording medium.

The above object may be achieved according to one aspect of the present invention, which provides a thermal printer wherein printing is effected on a planar recording medium, by heating and thereby coloring a thermally fusible material on the medium, comprising: a thermal print head having at least one heat-generating element each of which produces heat in contact with the recording medium, to effect printing on the surface; feeding means for feeding the print head and the recording medium relative to each other; and anti-sticking means for moving the print head and the recording medium relative to each other, to thereby prevent the print head and the recording medium from sticking to each other, when the heated thermally fusible material is solidified.

In the thermal printer of the present invention constructed as described above, the recording medium and the print head are moved relative to each other before the heated molten thermally fusible material is solidified. This arrangement is effective to prevent the print head from sticking to the heated thermally fusible material, since the relative movement between the print head and the recording medium occurs before the print head sticks to the thermally fusible material in the process of being solidified. Namely, the present arrangement prevents the print head from being kept in contact with the heated thermally fusible material for such a long time that allows the print head to stick to the material. Generally, relative movement is started immediately after the material is heated to a molten state or a color producing temperature. Alternatively, the relative movement is started at a terminal portion of the energizing period of the heat-generating element, or a suitable short time after the deenergization of the heat-generating element.

The present invention is effective to prevent the sticking of the print head, even where the average rate of relative feeding of the medium and the print head is considerably low, for some reason or other, for example, for waiting for printing data for the next line after the printing of the relevant line. In this case, the print head and the recording medium are moved relative to each other, immediately after the completion of printing of the current print line, so that the print head is aligned with the next print line. This arrangement prevents the print head to stick to the recording medium, since the print head is not held in contact with the heated thermally fusible material in the process of being cooled.

The anti-sticking means may be different from the feeding means. For example, the feeding means is exclusively designed for feeding the recording medium relative to the print head, while the anti-sticking means is exclusively designed for moving the print head relative to the medium in the medium feeding direction or in the direction perpendicular to the medium feeding direction. However, the anti-sticking means may preferably utilize the feeding means for moving the print head and the recording medium relative to each other for preventing the sticking of the print head.

In one form of the invention, the anti-sticking means effects at least one reciprocating movement of the print head and the recordidng medium relative to each other, with respect to a portion of the thermally fusible material which has been heated by each heat-generating element.

It is possible that the relative reciprocating movement of the print head and the recording medium occurs only once or two or more times for each energization of the heat-generating element. It is also possible that the relative reciprocating movement may occur only once or two or more times between two successive energizations of the heat-generating elements.

In another form of the invention, the print head has a plurality of heat-generating elements which are divided into a plurality of groups which are sequentially energized to produce heat at different times to effect printing along each print line. The anti-sticking means is operated upon energization of each of the plurality of groups of heat-generating elements. This arrangement prevents the print head from sticking to the local portions of the medium which are heated in an early portion of the printing operation of the relevant line. The above-indicated groups of heat-generating elements may be permanently fixed, as in a line print head in which the heat-generating elements arranged in a line are divided into sequentially energized groups. Alternatively, the members (heat-generating elements) of each group are temporarily established, or changed, depending upon the printing data for each print line. In the latter case, the heat-generating elements for producing red dots consistitute one group, and the heat-generating elements for producing black dots constitute another group, for example.

In the above form of the invention, the plurality of groups of heat-generating elements of the print head may consist of at least three groups. In this case, the anti-sticking means may be operated to cause a first relative movement of the print head and the recording medium in one of opposite directions, upon energization of one of any two adjacent groups of the at least three groups of heat-generating elements, and a second relative movement of the print head and the recording medium in the other direction, upon energization of the other of that two adjacent groups of heat-generating elements. Thus, the recording medium and the print head are moved relative to each other, in a zigzag manner with respect to the relevant print line. The relative movement corresponding to the last group of heat-generating elements may or may not include a feeding movement to the next print line so that the print head is aligned with the next print line.

In the same form of the invention, the anti-sticking means may be adapted to operate to move the print head and the recording medium relative to each other in one direction, upon energization of each of the plurality of groups of heat-generating elements. In this case, the relative movement corresponding to the last group of heat-generating elements may provides a feeding movement to the next print line. The instant arrangement is advantageous in that the anti-sticking means does not suffer from a backlash of its power transmission system, which would be encountered where the relative movements are provided as reciprocating movements with respect to the print line. In other words, the instant arrangement does not require means for eliminating the backlash, or does not require that the drive source of the anti-sticking means be operated by an additional amount to compensate for the backlash, for providing a desired effective distance of the relative movement of the print head and the recording medium.

In a further form of the invention, the feeding means feeds the recording medium relative to the print head in a feeding direction, and the print head consists of a line thermal print head which has a multiplicity of heat-generating elements which are arranged in a direction perpendicular to the feeding direction. In this case, the anti-sticking means utilizes the feeding means for moving the recording means in the feeding direction to prevent the print head and the recording medium from sticking to each other.

The object of the invention may also be achieved according to another aspect of the invention, which provides a thermal printer wherein printing is effected on a recording medium, by energizing a plurality of heat-generating elements of a thermal print head to produce different amounts of heat, according to respective sets of printing data, for thereby heating and coloring a thermally fusible material on the recording medium, comprising: synthesizing means for combining at least two of the sets of printing data, to prepare a synthesized set of printing data for producing an image corresponding to the at least two sets of printing data; heating control means for controlling the heat-generating elements such that the heat-generating elements corresponding to the at least two sets of printing data included in the synthesized set of printing data are energized in such an order that the energization of the heat-generating element corresponding to the set of printing data for producing a given amount of heat is started before the energization of the heat-generating element corresponding to the set of printing data for producing an amount of heat smaller than the given amount, the heating control means being adapted to simultaneously energize all of the heat-generating elements corresponding to the synthesized set of printing data which includes the set of printing data for producing a smallest amount of heat of the above-indicated different amounts of heat, such that the energization of the plurality of heat-generating elements is terminated with the simultaneous energization of all of the heat-generating elements corresponding to the synthesized set of printing data; and anti-sticking means for moving the print head and the recording medium relative to each other, to thereby prevent the print head and the recording medium from sticking to each other, when the heated thermally fusible material is solidified.

In the thermal printer according to this aspect of the invention, the energization of the heat-generating elements to heat the local portions of the recording medium with different amounts of thermal energy is started in the order of an amount of heat to be produced by the heat-generating elements. In the case where the energization of the heat-generating elements is achieved in a plurality of intermittent energization cycles, the heat-generating elements associated with the largest amount of heat are energized in the first energization cycle, and all the heat-generating elements associated with all the different amounts of heat including the smallest amount are simultaneously energized in the last energization cycle. Where the heat-generating elements are heated in a continuous fashion, the energization of the heat-generating element associated with the smallest amount of heat is started last. Accordingly, otherwise possible sticking of the print head to the recording medium may be effectively prevented by a relative movement between the print head and the recording medium, which is provided by the anti-sticking element, when the printing operation of the relevant print line is terminated with the simultaneous energization of all the heat-generating elements that are assigned to heat the local portions of the recording medium with the different amounts of thermal energy. Namely, the instant arrangement eliminates any portions of the recording medium which have been solidified in contact with the print head.

In one form of the above aspect of the invention, the heating control means is adapted such that the heat-generating element corresponding to the set of printing data for the smallest amount of heat is energized by applying thereto a current pulse having a pulse width corresponding to the smallest amount of heat, while the heat-generating elements corresponding to the at least two sets of printing data for the other amounts of heats are energized by applying thereto corresponding numbers of current pulses having the pulse width, before all the heat-generating elements corresponding to the synthesized set of printing data are energized. In this case, the local portions of the recording medium which are heated with a relatively large amount of heat are heated intermittently by intermittent energizing operations of the heat-generating elements.

In another form of the same aspect of the invention, the above-indicated at leat two sets of printing data cause the corresponding heat-generating elements to produce different amounts of heat for forming print dots having respective different colors. For instance, a multi-color heat-sensitive recording medium requires a considerably larger amount of thermal energy for producing red dots, than that for producing black dots.

However, the present aspect of the invention may be applied to a thermal printer wherein the size of the printed dots produced by the heat-generating elements is suitably changed, according to the amount of thermal energy applied thereto.

It will be understood that the first aspect of the present invention for moving the print head and the recording medium relative to each other for preventing the sticking of the print head may be suitably combined with the present aspect of the invention wherein all the heat-generating elements assigned to heat the portions of the recording medium with different amounts of thermal energy are simultaneously energized to complete a printing operation of the relevant line.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which:

FIG. 7 is a schematic plan view showing a thermal print head used in another embodiment of the invention;

FIGS. 8(*a*)–8(*d*) are illustrations showing a change in relative position of the thermal print head of FIG. 7 and the heat-sensitive paper;

FIG. 10 is a graph showing a relationship between colors produced on a heat-sensitive medium, and the number of current pulses applied to heat-generating elements of a thermal printer, i further embodiment of the invention;

FIGS. 11(*a*)–11(*d*) provides a timing chart showing various signals used in a printing operation on the printer of FIG. 10, wherein red and black dots are produced on a heat-sensitive paper;

DETAILED DESCRIPTION OF THE PREFERRED EMBODIMENTS

Figure 1:
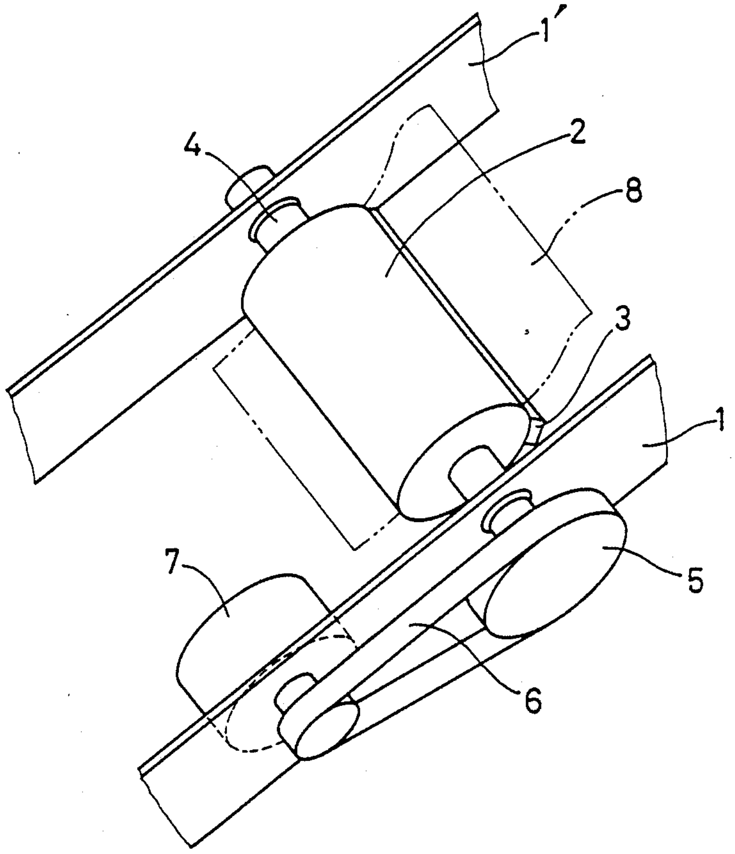
FIG. 1 is a fragmentary perspective view of one embodiment of a thermal printer of the present invention.

Referring first to FIG. 1, there is illustrated a thermal line printer having a cylindrical platen 2 fixedly mounted on a platen shaft 4 which is rotatably supported by a pair of opposed frames 1, 1'. Between the two frames 1, 1', there is fixedly provided a thermal print head 3 such that the print head 3 faces a circumferential surface of the platen 2. The platen shaft 4 has a drive wheel 5 which is connected by a belt 6 to a stepping motor 7, so that the platen 2 is rotated by the stepping motor 7, for feeding a planar recording medium in the form of a heat-sensitive paper 8, between the platen 2 and the thermal print head 3, in a feeding direction perpendicular to an axis of rotation of the platen 2, while thermal printing is effected on a recording surface of the paper 8 by the print head 3. The recording surface of the heat-sensitive paper 8 is coated with a layer of a thermally fusible material, so that a colored image dots are produced by heating and thereby melting the thermally fusible material in appropriate local portions of the paper 8.

Figure 3:
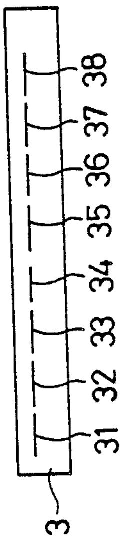
FIG. 3 is a schematic plan view of the print head.

The thermal print head 3 has a multiplicity of heat-generating elements which are arranged in a straight row parallel to a line of printing along the length of the platen 2. The heat-generating elements are divided into a total of eight groups 31–38, as indicated in FIG. 3. These eight groups 31–38 of heat-generating elements are energized at different times, in the order of the reference numerals.

It will be understood that the stepping motor 7 cooperates with the platen 2 to provide a feeding mechanism for feeding the print head 3 and the heat-sensitive paper 8 relative to each other in the feeding direction. The stepping motor 7 is operated in a simultaneous two-phase energization mode, to feed the paper 8 by one line spacing distance, in four two-phase energization steps which consist of AB phase energization, BC phase energization, CD phase energization, and DA phase energization, when the motor 7 is operated in a forward direction to feed the paper 8 in the forward feeding direction.

Figure 2:
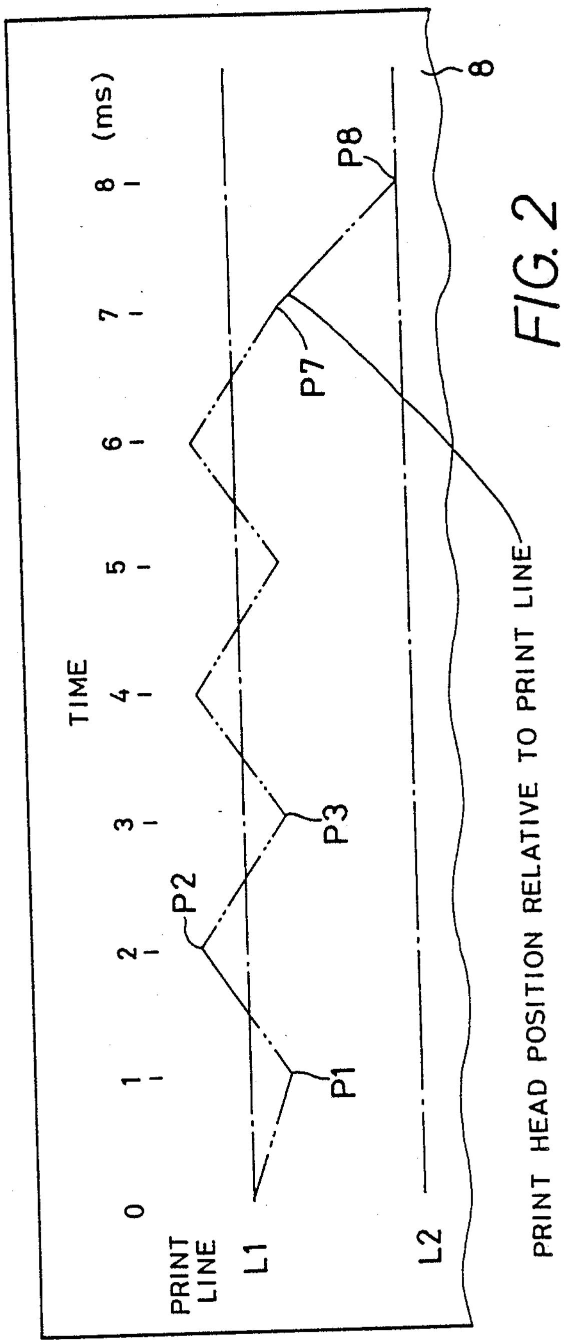
FIG. 2 an illustration showing a change in relative position of a thermal print head and a heat-sensitive paper, which occurs during printing on the thermal printer of FIG. 1.
Figure 4:
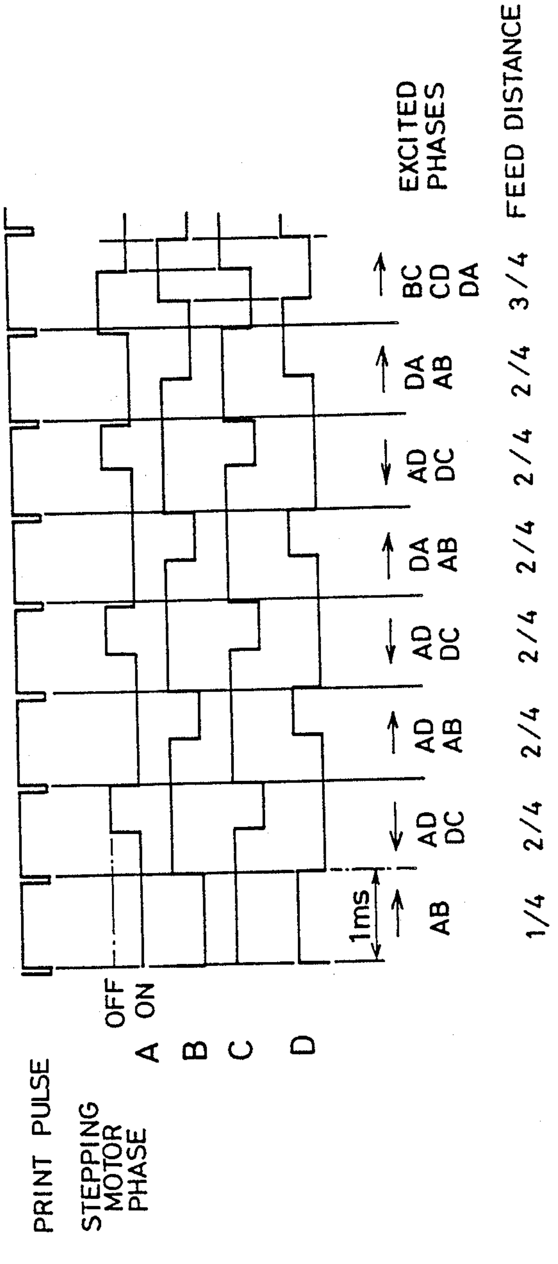
FIG. 4 timing chart illustrating an operation of a paper feed motor of the printer.

The timing chart of FIG. 4 shows an energization cycle of the stepping motor 7 for moving the heat-sensitive paper 8 relative to the print head 3, when the eight groups 31–38 of heat-generating elements are sequentially energized to print a given print line L1, as indicated in FIG. 2, wherein the position of the print head 3 relative to the print line L1 is indicated by broken line. Described more specifically, the selective energization of the heat-generating elements of each group 31–38 (FIG. 3) is effected for a period of 1 msec., and the stepping motor 7 is operated as shown in FIG. 4 upon energization of each of the eight groups 31–38, so that the relative position of the print head 3 with respect to the print line L1 is changed as indicated at P1, P2, P3, ... P8. These relative movements between the print head 3 and the heat-sensitive paper 8 are effected according to the principle of the present invention, in order to prevent the print head 3 from sticking to the heated thermally fusible material on the paper 8 during solidification of the heated material.

Described more particularly referring to the timing chart of FIG. 4, the energization cycle of the stepping motor 7 for printing the print line L1 will be described in detail. Initially, the motor 7 is operated in the forward direction, so as to establish the AB phase for 1 msec., whereby the paper 8 is fed in the forward direction by a distance equal to one-fourth of the line spacing distance upon energization of the first group 31 of heat-generating element. The resulting position of the print head 3 relative to the paper 8 is indicated at Pl. Upon energization of the second group 32 of heat-generating elements, the stepping motor 7 is operated in the reverse direction, so as to establish the AD phase for 0.5 msec. and the DC phase for 0.5 msec., whereby the paper 8 is fed in the backward direction by a distance equal to two-fourths of the line spacing distance. The resulting position of the print head 3 relative to the paper 8 is indicated at P2. Then, the stepping motor 7 is operated, again in the forward direction, so as to establish the AD phase for 0.5 msec. and the AB phase for 0.5 msec., upon enerigization of the third group 33 of heat-generating elements, whereby the paper 8 is fed in the forward direction, also by the distance equal to the two-fourths of the line spacing distance. The resulting position of the print head 3 relative to the paper 8 is indicated at P3, which is the same as the position Pl. In a similar manner, the stepping motor 7 is operated in the forward and reverse directions alternately, until the motor 7 is operated in the forward direction to move the relative position of the print head 3 to P7, upon energization of the seventh group 37 of heat-generating elements. Upon energization of the eight or last group 38 of heat-generating element, the stepping motor 7 is operated in the forward direction, so as to establish the BC phase for 0.33 msec., the CD phase for 0.33 msec., and the DA phase for 0.33 msec., whereby the paper 8 is fed in the forward direction by a distance equal to three-fourths of the line spacing distance. As a result, the print head 3 whose relative position is indicated at P8 is located in alignment with the next print line L2. It is noted arrows in FIG. 4 indicate the directions of operation of the stepping motor 7.

In connection with the relative movements between the print head 3 and the heat-sensitive paper 8 discussed above, it is noted that it takes about 1msec. for the thermally fusible material of the paper 8 to be solidified, that is, for the temperature of the heated material to cool from the melting range down to the solidifying range. In view of this change in the state of the fusible material during the 1-msec. period, the heated portion of the fusible material of the paper 8 is moved relative to the print head 3 (heat-generating elements) during the same 1-msec. period, in order to protect the print head 3 from sticking to the fusible material.

However, the solidifying time of the thermally fusible material more or less differs depending upon the heat-sensitive paper used, and the precise period of time during which the stepping motor 7 is operated is determined based on an experiment conducted on the specific paper.

Figure 5:
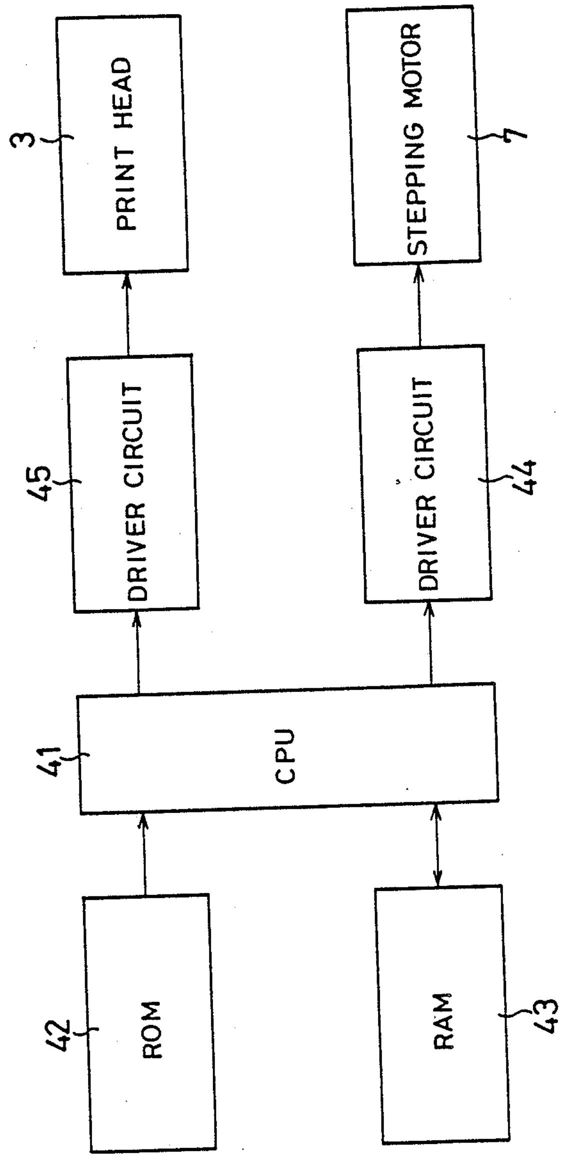
FIG. 5 is a schematic block diagraph illustrating a control system of the printer.

Referring next to the block diagram of FIG. 5, a control system for the instant thermal printer will be described.

The control system includes a central processing unit (CPU) 41, and a read-only memory (ROM) 42 and a random-access memory (RAM) 43 which are connected to the CPU 41. The ROM 42 stores various control programs such as a program indicated by the flow chart of FIG. 6, and the RAM 43 serves as a working memory for temporarily storing various data during operation of the CPU 41, and image information indicative of images to be reproduced on the heat-sensitve paper 8 by the print head 3. The stepping motor 7 and the print head 3 are connected to the CPU 41, through respective driver circuits 44, 45.

The feeding mechanism including the platen 2 and the motor 7 cooperates with the CPU 41 and the driver circuit 44 to constitute feeding means for feeding the paper 8 relative to the print head 3 in the feeding direction perpendicular to the axis of rotation of the platen 2. In the present embodiment, this feeding means is utilized as anti-sticking means for moving the print head 3 and the paper 8 relative to each other, when the thermally fusible material on the paper 8 is solidified upon energization of each of the eight groups 31–28 of heat-generating elements of the print head 3, so that the relative movements prevent the print head 3 from sticking to the heated thermally fusible material on the paper 8.

Figure 6A:
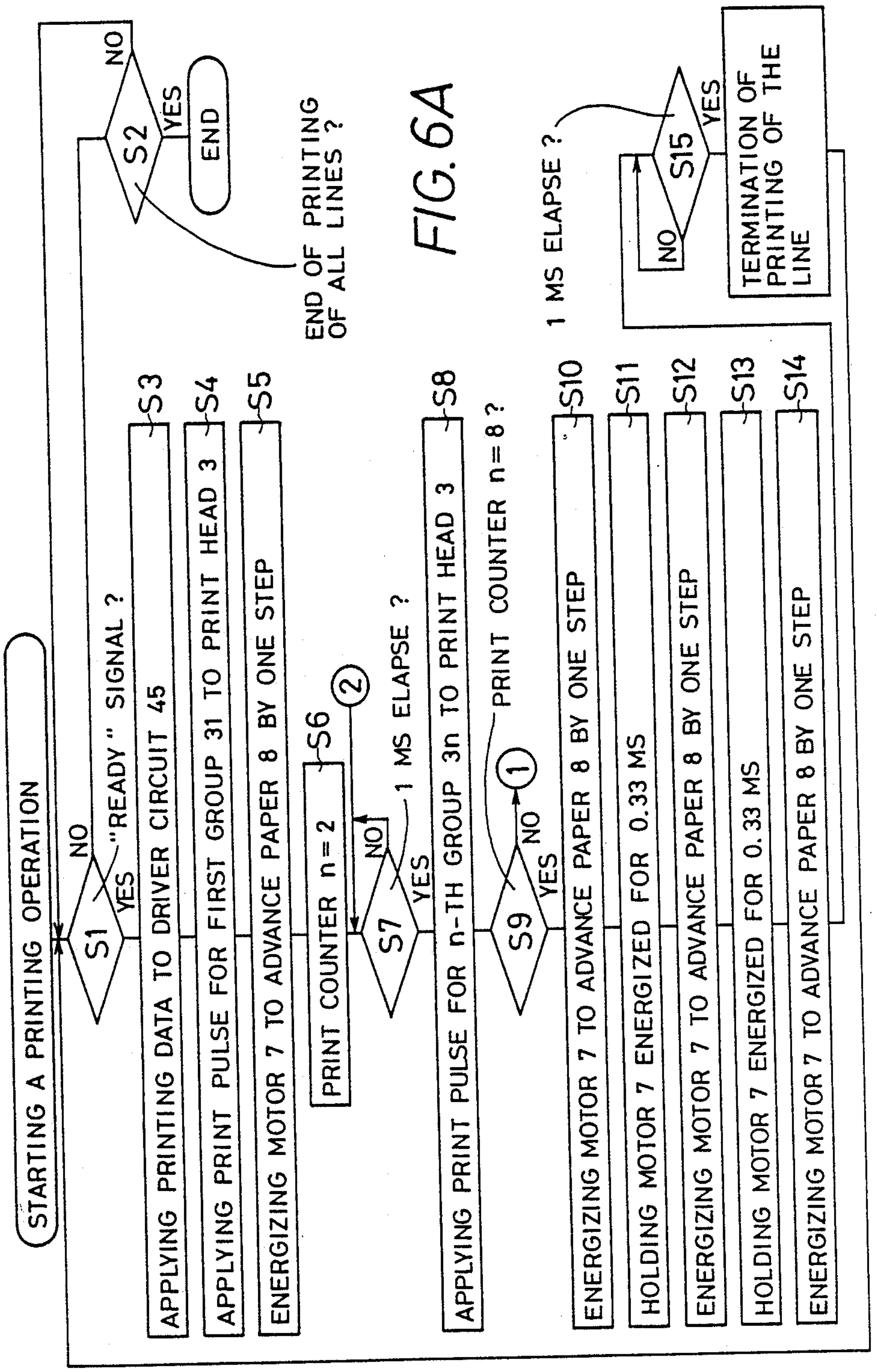
FIGS. 6*a* and 6*b* are a flow chart indicating a printing operation of the printer.
Figure 6B:
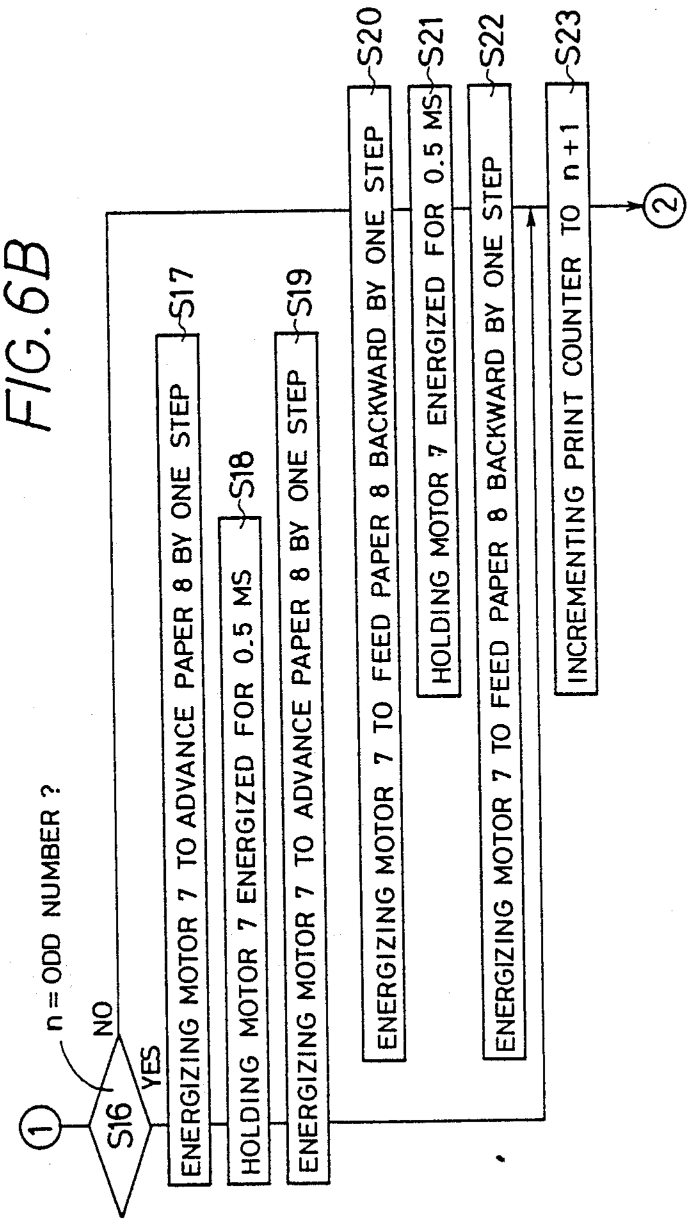

Reference is now made to FIG. 6, to explain an operation of the instant thermal printer, which is effected to move the print head 3 and the paper 8 relative to each other during printing of a line by the eight groups 31–38 of heat-generating element.

Initially, the CPU 41 executes step Sl to determine whether a "READY" signal for printing a line is received from the RAM 43. If a negative decision (NO) is obtained in step S1, the control flow goes to step S2 to determine whether an "END OF PRINT" signal is received from the RAM 43, that is, whether all of the lines to be printed have been printed. If an affirmative decision (YES) is obtained in step S2, the control routine of FIG. 6 is ended. If a negative decision (NO) is obtained in step S2, the control flow goes back to step S1. If the "READY" signal is present, step S1 is followed by step S3 in which a set of printing data for the relevant line is applied to the driver circuit 45, and by step S4 in which a print pulse for controlling the first group 31 of heat-generating elements is applied to the print head 3, whereby the heat-generating element of the first group 31 are selectively energized to print a first length of the relevant print line. The control flow then goes to step S5 wherein the stepping motor 7 is energized to advance the paper 8 in the forward direction by one step (by a distance equal to one-fourth of the line spacing distance). Then, step S6 is executed to increment the content "n" of a print counter (incorporated in the CPU 41) to "2", for energizing the heat-generating elements of the second group 32.

Step S6 is followed by step S7 to determine whether a 1 msec. period has elapsed after generation of the print pulse. This step S7 is repeatedly executed until the 1-msec. period has elasped. The control flow then goes to step S8 in which a print pulse for the next group of heat-generating elements of the print head 3 is generated. Step S8 is followed by step S9 to determine whether the content "n" of the print counter is equal to "8" or not. If the content "n" is equal to "8", the CPU 41 implements step S10 in which the stepping motor 7 is energized to advance the paper 8 by one step, and step S11 wherein the motor 7 is held energized for 0.33 msec. The motor 7 is again energized to advance the paper 8 by one step in step S12, and held energized for 0.33 msec. in step S13. In the next step S14, the motor 7 is again exergized to advance the paper 8 by another one step. As a result, the paper 8 is advanced by a total of three steps which correspond to a distance equal to three-fourths of the line spacing distance. Namely, the position of the print head 3 relative to the print line L1 is changed from position P7 to position P8, as indicated in FIG. 2.

Then, the CPU 41 determines in step S15 whether the 1-msec. period has elapsed after the generation of the print pulse for the n-th group (eighth group 38) of heat-generating elements. If an affirmative (YES) decision is obtained in step S15, an operation to terminate the printing of the relavant line (L1) is executed, and the control flow goes back to step S1. As a result, the print head 3 is located on the next print line (L2) and is ready for printing this next line. If a negative decision (NO) is obtained in step S15, this step is repeatedly executed, so that the paper 8 is held energized for the 1-msec. period.

If a negative decision (NO) is obtained in step S9, step S16 is implemented to determine whether the current content "n" of the print counter is an odd number or not. If an affirmative decision is obtained in step S16, the control flow goes to step S17 wherein the stepping motor 7 is energized to advance the paper 7 in the forward direction by one step, and then to step S18 wherein the motor 7 is held energized for 0.5 msec. In the following step S19, the motor 7 is again energized to advance the paper 7 by one step.

If a negative decision is obtained in step S16, the control flow goes to step S20 to energize the motor 7 to feed the paper 7 in the backward direction by one step, and to step S21 in which the motor 7 is held energized for 0.5 msec. In the following step S22, the motor 7 is again energized to further move the paper 8 backward by one step.

Step S19 and step S22 are followed by step S23 in which the content "n" of the print counter is incremented to "n+1", and the control flow goes back to step S7 to determine whether the 1-msec. period has elapsed after the generation of the print pulse for the n-th group of heat-generating element.

In the manner described above, the eight groups 31–38 of heat-generating elements of the print head 3 are sequentially energized to print a line, while the paper 8 is moved relative to the print head 3, as indicated in FIG. 2, with the stepping motor 7 operated in the simultaneous two-phase energization mode, as indicated in FIG. 4.

It will be understood that the distances and directions of relative movements of the paper 8 and the print head 3 upon energization of the eight groups 31–38 of heat-generating elements may be changed as desired, provided that the print head 3 is aligned with the next print line at the end of the last movement of the paper 8.

Referring next to FIGS. 7, 8(*a*)–8(*d*) and 9, another embodiment of the present invention will be described. Unlike the preceding embodiment, the heat-generating elements of the print head 3 are divided into a relatively small number of groups, namely, into three groups 31, 32 and 33, as indictaed in FIG. 7. Further, the paper 8 is moved in the forward direction relative to the print head 3 by a distance equal to one-fourth of the line spacing distance upon energization of each of the three groups 31, 32, 33, unlike the paper 8 in the preceding embodiment wherein the paper 8 is moved with respect to the relevant print line, in the forward and backward directions alternately when the eight groups 31–38 of heat-generating elements are sequentially energized. In other aspects, the instant embodiment is similar to the preceding embodiment, and the mechanical and control arrangements of FIGS. 1 and 5 of the preceding embodiment apply to the instant embodiment.

Described in detail by reference to FIG. 8 wherein printed lengths of the relevant print line are indicated by hatched blocks, the position of the print head 3 (indicated by one-dot chain line) relative to the paper 8 is changed upon sequential energization of the three groups 31–33 of heat-generating elements to print the corresponding lengths of the print line, for protecting the print head 3 from sticking to the heated thermally fusible material on the heat-sensitive paper 8.

An operation of the instant thermal printer will be described referring also to the flow chart of FIG. 9. Initially, the control flow goes to step S31 to determine whether the "READY" signal is present or not. If not, step S32 is executed to check if all the lines to be printed on the paper 8 have been printed, or not. If not, steps S31 and 32 are repeatedly executed until the "READY" signal is received from the RAM 43. Upon reception of the "READY" signal, the CPU 41 applies printing data from the RAM 43 to the driver circuit 45, and sets the print counter to "1" for controlling the first group 31 of heat-generating elements of the print head 3. Then, the control flow goes to step S35 in which the heat-generating elements of the first group 31 are selectively energized to print the first length of the relevant print line, as indicated in FIG. 8(*a*). Step S35 is followed by step S36 in which the stepping motor 7 is energized to advance the paper 8 in the forward direction by a distance equal to one third of the line spacing distance, as indicated in FIG. 8(*b*).

Then, the CPU 41 determines whether the current content "n" of the print counter is equal to "3", or not. At this point of time, the content "n" is "1", a negative decision (NO) is obtained in step S37, and step S38 is executed to increment the print counter to "n+1". Namely, the print counter is set to "2". Step S38 is followed by step S35 in which the second group 32 of heat-generating elements is energized to print the second length of the relevant print line, and step S36 is executed to energize the motor 7 to advance the paper 8 by the distance equal to the one-third of the line spacing distance, as indicated in FIG. 8(*c*). The control flow then goes to step S37. Since the current content "n" of the print counter is equal to ¢2", step S38 is implemented whereby the print counter is set to "3", and the third group 33 of heat-generating elements is energized in step S35 to print the last or third length of the relevant print line. Then, step S36 is executed to advance the paper 8 by the same distance as indicated above. As a result, the paper 8 has been advanced to the next print line (by a distance equal to the line spacing distance), as indicated in FIG. 8(*d*). Since an affirmative decision (YES) is obtained in step S37 at this time, the control flow goes back to step S31, and the CPU 41 waits for the generation of the next "READY" SIGNAL, for printing the next line, in the same manner as described above.

Figure 9:
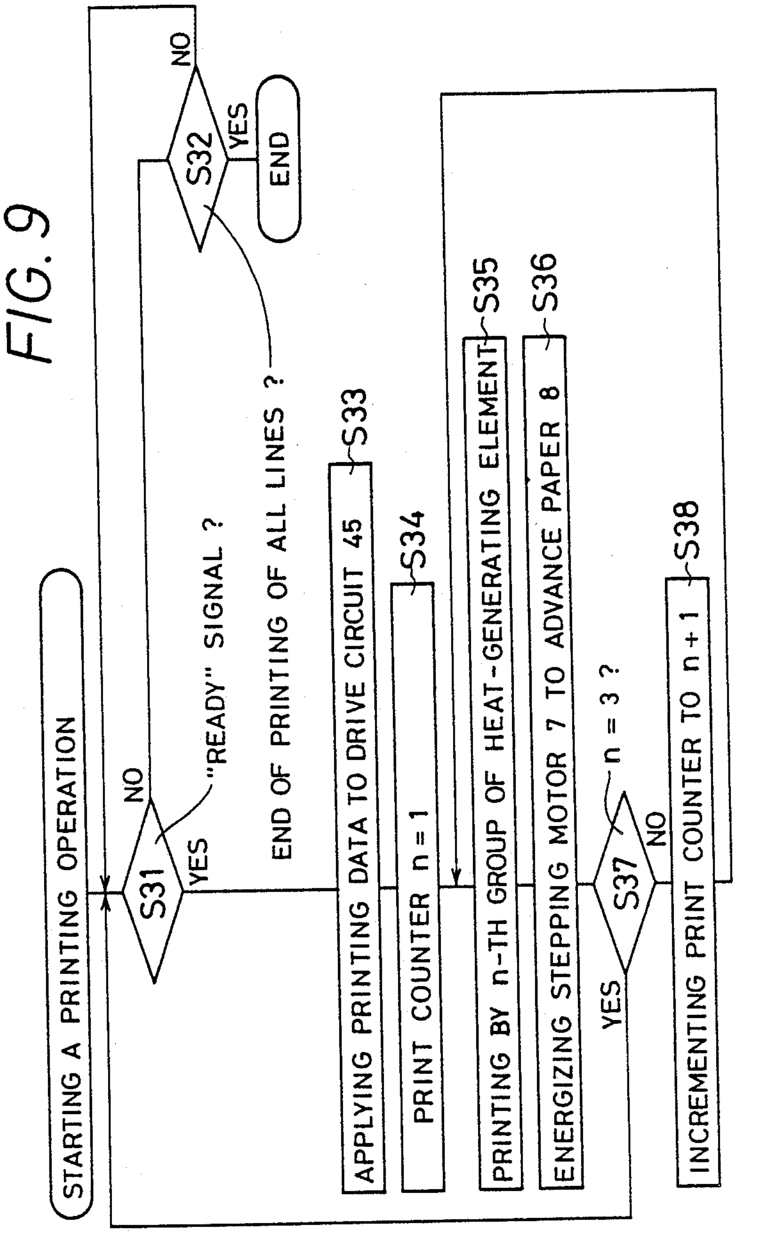
FIG. 9 is a flow chart inidicating a printing operation of the printer of the embodiment of FIGS. 7 and (*a*)–8(*d*)

While the second embodiment of FIGS. 7–9 is adapted such that the paper 8 is advanced by a distance equal to one-third of the line spacing distance, upon energization of each of the three groups 31–33 of heat-generating elements, the number of groups or divisions of the heat-generating elements of the print head 3 may be suitably changed, and the advancing distance of relative movement of the paper 8 and print head 3 is not limited to a distance which is equal to a quotient obtained by dividing the line spacing distance by the number of groups of the heat-generating elements. Further, the advancing distance corresponding to one group of heat-generating elements may differ from that corresponding to another group.

The thermal printers of the preceding two embodiments of FIGS. 1–9 may be further adapted to provide another advantageous feature, when operated with the heat-sensitive paper 8 adapted for printing in two or more colors, for example, in black and red colors on its white background surface. In this case, the thermally fusible material on the paper 8 may be adapted such that black dots are formed with an electric current being applied at one time to the appropriate heat-generating elements of the print head 3, with a single current pulse having a suitable pulse width, while red dots are formed with the electric current being intermittently applied to the appropriate heat-generating elements at different times t1–t5, with five successive current pulses having the same pulse width as that for the black dots, as indicated in FIG. 10. The current pulses are indicated as STB in FIG. 11(*c*).

Figure 12:
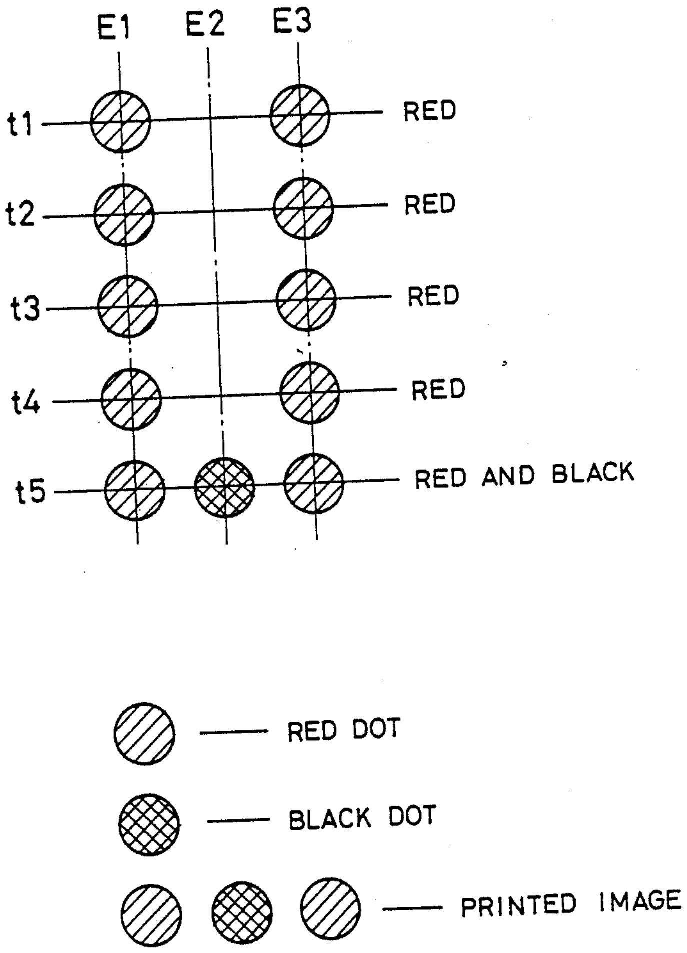
FIG. 12 is an illustration showing energization of the heat-generating elements in the printing operation of FIG. 11.

Suppose each of the eight groups 31–38 of heat-generating elements of the print head 3 used in the first embodiment of FIGS. 1–6 consists of three heat-generating elements E1, E2 and E3, a printing image consisting of a first red dot, a second black dot and a third red dot, for example, may be formed along a portion of the length of a print line, by energizing the appropriate heat-generating elements E1, E2 and E3 at different times t1–t5, as indicated in FIG. 12.

It is noted that a local portion of the heat-sensitive paper 8 which has been heated by energization of each heat-generating element E1–E3 with each current pulse STB is able to maintain a substantive portion of the given thermal energy until the same portion is heated again with the next current pulse STB, since the thermal conductivity of the heat-sensitive element is not so high, and since the time interval between the two successive current pulses STB is extremely short. Therefore, a total of five energizing operations (at the times t1–t5) of the heat-generating elements E1 and E3 according to respective sets of RED PRINTING DATA as indicated in FIG. 11(*a*) permit the corresponding local portions of the heat-sensitive paper 8 to be heated to an extent sufficient to be red-colored.

According to the feature of this embodiment, only the heat-generating elements E1 and E3 corresponding to the red dots are energized at the first four consecutive times t1, t2, t3 and t4 according to the RED PRINTING DATA, with the four successive current pulses STB applied to the elements E1, E3, as indicated in FIGS. 11(*a*), 11(*c*) and 12. Then, in the last energization cycle t5 (FIG. 12), all of the three heat-generating elements E1, E2 and E3 are energized according to a set of BLACK AND RED PRINTING DATA, as also indicated in FIGS. 11(*a*), 11(*c*) and 12. Thus, the printing operation in the relevant portion of the line is terminated with the simultaneous energizations of all of the three heat-generating elements E1, E2, E3 of the relevant group.

Since the heat-sensitive paper 8 is moved relative to the print head 3 by a suitable distance immediately after the energization of the heat-generating elements E1, E2, E3 at the time t5, as explained with respect to the first embodiment, the print head 3 is prevented from sticking to the thermally fusible material on the paper 8 (i.e., to the printed local portions of the paper 8). Thus, the paper 8 may be smoothly fed to the next print line. As described above by reference to FIG. 4, the relative movement between the print head 3 and the paper 8 takes place during a 1-msec. period during which the heated molten thermally fusible material is solidified or cooled down to the solidifying point.

Figure 13:
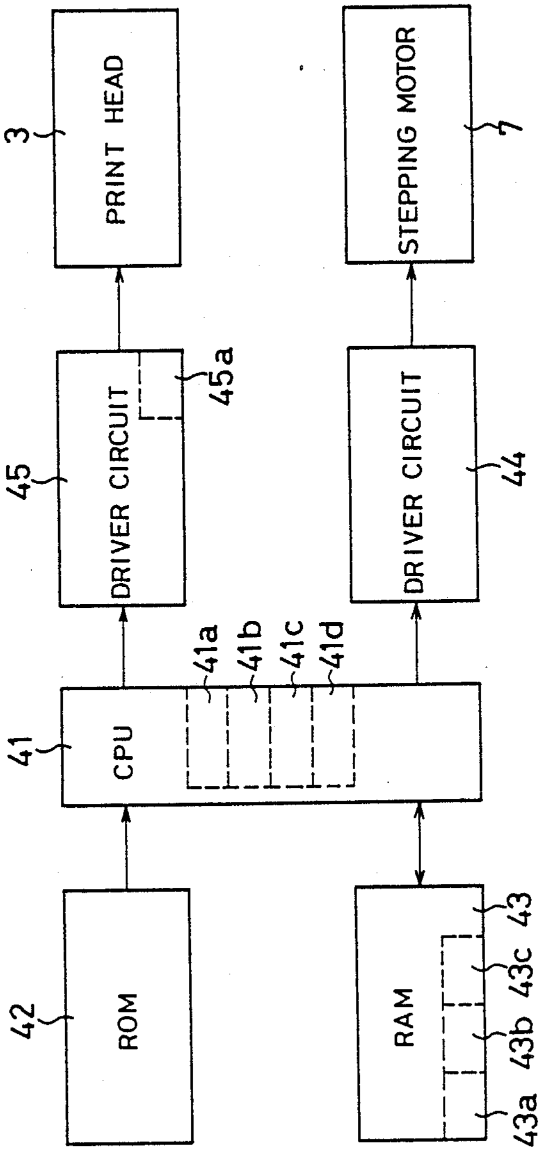
FIG. 13 is a schematic block diagraph showing a control system of the printer of FIGS. 10–12.

In the instant embodiment, the control system is modified as depicted in FIG. 13, wherein the CPU 41 incorporates a data synthesizing portion 41*a* for combining the RED PRINTING DATA indicative of red dots, with BLACK PRINTING DATA indicative of black dots, to prepare synthesized sets of printing data. The CPU 41 further incorporates a latch signal generating portion 41*b* which produces a LATCH signal as indicated in FIG. 11(*b*), and a strobe pulse generating portion 41*c* which produces the current pulses STB as indicated in FIG. 11(*c*). The CPU 41 further has a feed pulse generating portion 41*d* for producing a feed pulse LF indicated in FIG. 11(*d*) to be applied to the driver circuit 44, for operating the stepping motor 7. While the feed pulse LF is simplified in FIG. 11(*d*), the stepping motor 7 is operated as described above by reference to FIG. 4, when the instant feature of FIGS. 10–13 is applied to the embodiment of FIGS. 1–6.

The RAM 43 includes a black data memory 43*a* for storing the BLACK PRINTING DATA for one print line, a red data memory 43*b* for storing the RED PRINTING DATA for the line, and a synthesized data memory 43*c* for storing the synthesized sets of printing data for the same line. The data synthesizing portion 41*a* of the CPU 41 functions to prepare the synthesized sets of printing data, based on the contents of the memories 43*a* and 43*b*, and stores the prepared synthesized printing data into the memory 43*c* of the RAM 43.

The LATCH signal produced by the data latching portion 41*b* of the CPU 41 is applied to the driver circuit 45, so that the synthesized printing data transferred from the synthesized data memory 43*c* is latched in a latch 45*a* provided in the driver circuit 45.

As described above, the RED PRINTING DATA of the synthesized printing data for each group of heat-generating elements is first fed from the synthesized data memory 43*c* to the latch 45*a* of the driver circuit 45 via the CPU 41, and the RED PRINTING DATA is latched in the latch 45*a*, in response to the LATCH signal from the latch signal generating portion 41*b* of the CPU 41. The individual sets of RED PRINTING DATA corresponding to the first four energization cycles t1–t4 are applied to the print head 3, in response to the current pulses STB produced by the strobe pulse generating portion 41*c* of the CPU 41, whereby the heat-generating elements E1 and E3 are energized to heat the corresponding local portions of the heat-sensitive paper 8.

Then, the last set of printing data consisting of the RED PRINTING DATA and the BLACK PRINTING DATA for the last energization cycle t5 is applied to the latch 45*a*, and latched therein in response to the LATCH signal from the latch signal generating portion 41*b*. Upon generation of the fifth current pulse STB from the strobe pulse generating portion 41*c*, all of the three heat-generating elements E1, E2 and E3 are energized to heat the corresponding local portions of the paper 8. Thus, the printing operation by the heat-generating elements E1–E3 ends, without cooling of the once heated portions of the paper 8. Then, the feed pulse LF is generated from the feed pulse generating portion 41*d* of the CPU 41, and applied to the stepping motor 7 through the driver circuit 44, whereby the paper 7 is moved relative to the print head 3 in the feeding direction by a suitable distance, as described above with respect to the preceding embodiments of FIGS. 1–9.

Although the embodiment of FIGS. 10–13 has been described as applied to the thermal printers of FIGS. 1–9 wherein the groups of heat-generating elements 31–38 or 31–33 are sequentially energized at different times, the concept of the instant embodiment of FIGS. 10–13 may be practiced on a thermal printer wherein an array of heat-generating elements of the print head is selectively energized at one time, according to the synthesized printing data indicated above. In this case, the paper 8 is fed by the line spacing distance, in response to the feed pulse LF, at the end of the printing operation of each print line, whereby the print head 3 is aligned with the next print line.

Although the third embodiment of FIGS. 10–13 is adapted to effect printing in black and red colors, this embodiment may be modified to print in the other colors, or in three or more colors. In this case, the thermally fusible material is suitably adapted to thermally produce the appropriate colors, and the numbers of current pulses STB for the colors may be suitably determined.

In the illustrated embodiments, the paper 8 is fed and moved relative to the print head 3, it is possible that the print head 3 is moved relative to the recording medium.

While the invention has been described in its presently preferred embodiments with a certain degree of particularity, it is to be understood that the invention is not limited to the precise details of the illustrated embodiments, but may be embodied with various changes, modifications and improvements, which may occur to those skilled in the art, without departing from the spirit and scope of the invention defined in the following claims.

What is claimed is:

1. A thermal printer wherein printing is effected on a planar recording medium, by heating and thereby coloring a thermally fusible material on the medium, comprising:

a thermal print head having at least one heat-generating element each of which produces heat in contact with said recording medium, to effect printing on said medium;

feeding means for effecting a relative printing movement between said print head and said recording medium, which movement is necessary to effect printing on said medium; and anti-sticking means for effecting a relative anti-stick movement between said print head and said recording medium, said relative anti-stick movement being different from said relative printing movement and effected to prevent said print head and said recording medium from sticking to each other, when the heated thermally fusible material is solidified.

2. A thermal printer according to claim 1, wherein said anti-sticking means utilizes said feeding means to effect said relative anti-stick movement for moving said print head and said recording medium relative to each other for preventing sticking thereof.

3. A thermal printer according to claim 1, wherein said anti-sticking means effects at least one reciprocating movement of said print head and said recording medium relative to each other, as said relative anti-stick movement, with respect to a portion of said thermally fusible material which has been heated by said at least one heat-generating element.

4. A thermal printer according to claim 1, wherein said feeding means feeds said recording medium relative to said print head in a feeding direction, and said print head consists of a line thermal print head which has a multiplicity of heat-generating elements which are arranged in a direction perpendicular to said feeding direction, said anti-sticking means utilizes said feeding means for moving said recording means in said feeding direction to prevent the print head and the recording medium from sticking to each other.

5. A thermal printer wherein printing is effected on a recording medium, by energizing a plurality of heat-generating elements of a thermal print head to produce different amounts of heat, according to respective sets of printing data, for thereby heating and coloring a thermally fusible material on said recording medium, comprising:

synthesizing means for combining at least two of said sets of printing data, to prepare a synthesized set of printing data for producing an image corresponding to said at least two sets of printing data;

heating control means for controlling said heat-generating elements such that the heat-generating elements corresponding to said at least two sets of printing data included in said synthesized set of printing data are energized in such an order that the energization of the heat-generating element corresponding to the set of printing data for producing a given amount of heat is started before the energization of the heat-generating element corresponding to the set of printing data for producing an amount of heat smaller than said given amount, said heating control means simultaneously energizing all of the heat-generating elements corresponding to said synthesized set of printing data which includes the set of printing data for producing a smallest amount of heat of said different amounts of heat, the energization of said plurality of heat-generating elements being terminated with the simultaneous energization of all of the heat-generating elements corresponding to said synthesized set of printing data; and anti-sticking means for moving said print head and said recording medium relative to each other, to thereby prevent said print head and said recording medium from sticking to each other, when the heated thermally fusible material is solidified.

6. A thermal printer according to claim 5, wherein said heating control means energizes the heat-generating element corresponding to said set of printing data for said smallest amount of heat, by applying thereto a current pulse having a pulse width corresponding to said smallest amount of heat, said heating control means energizing the heat-generating elements corresponding to said at least two sets of printing data for the other amounts of heats, by applying thereto corresponding numbers of current pulses having said pulse width, before said all of the heat-generating elements corresponding to said synthesized set of printing data are energized.

7. A thermal printer according to claim 5, wherein said at least two sets of printing data cause the corresponding heat-generating elements to produce different amounts of heat for forming print dots having respective different colors.

8. A thermal printer wherein printing is effected on a planar recording medium, by heating and thereby coloring a thermally fusible material on the medium, comprising:

a thermal print head having a plurality of heat-generating elements each of which produces heat in contact with said recording medium, to effect printing on said medium, said heat-generating elements being divided into a plurality of groups which are energized at different times to print a line;

feeding means for effecting a relative feeding movement between said print head and said recording medium; and anti-sticking means for moving said print head and said recording medium relative to each other, after energization of each one of said plurality of groups of heat-generating elements and before energization of a next one of said groups of heat-generating elements, whereby said print head and said recording medium are prevented from sticking to each other, when the heated thermally fusible material is solidified.

9. A thermal printer according to claim 8, wherein said plurality of groups of heat-generating elements of said print head consist of at least three groups, said anti-sticking means being operated to cause a first relative movement of said print head and said recording medium in one of opposite directions, upon energization of one of any two adjacent groups of said at least three groups of heat-generating elements, and a second relative movement of said print head and said recording medium in the other direction, upon energization of the other of said any two adjacent groups of heat-generating elements.

10. A thermal printer according to claim 8, wherein said anti-sticking means is operated to move said print head and said recording medium relative to each other in one direction, upon energization of each of said plurality of groups of heat-generating elements.

* * * * *

UNITED STATES PATENT AND TRADEMARK OFFICE
CERTIFICATE OF CORRECTION

PATENT NO. : 4,970,529

DATED : November 13, 1990

INVENTOR(S) : Michio TSUCHIYA et al.

It is certified that error appears in the above-identified patent and that said Letters Patent is hereby corrected as shown below:

On the cover page, please change "[73] Assignee: Brother Kogyo Kabushiki Kaisha, Tokyo, Japan" to --[73] Assignees: Brother Kogyo Kabushiki Kaisha, Nagoya, Japan and Nippon Telegraph and Telephone Corporation, Tokyo, Japan--

Signed and Sealed this

Sixteenth Day of August, 1994

Attest:

BRUCE LEHMAN

*Attesting Officer* *Commissioner of Patents and Trademarks*